United States Patent [19]
Grube

[11] 3,856,594
[45] Dec. 24, 1974

[54] METHOD FOR MAKING A DECORATED OBJECT

[75] Inventor: John R. Grube, Waterville, Ohio

[73] Assignee: General Mills Fun Group, Inc., Toledo, Ohio

[22] Filed: Nov. 1, 1973

[21] Appl. No.: 412,002

[52] U.S. Cl............................. 156/63, 35/1, 35/73, 156/265, 161/12
[51] Int. Cl.............................................. B44l 5/00
[58] Field of Search........ 161/12; 156/63, 256, 264, 156/265; 35/1, 73

[56] References Cited
UNITED STATES PATENTS
2,732,597  1/1956  Contratto.......................... 156/63 X
3,438,840  4/1969  George............................. 156/63 X Primary Examiner—Edward G. Whitby
Attorney, Agent, or Firm—Henry K. Leonard

[57] ABSTRACT

A method for making a decorated object. Three dimensional geometric shapes such as squares, triangles, rectangles and the like are made by splitting pieces of wood having unit widths and standard thicknesses to form the shapes. All of the shapes so formed have dimensions along their sides which are equal to a unit length or a fraction of a unit length. Selected numbers of selected shapes are adhered in patterned relationships to the surfaces of the object to be decorated. A splitting guide may be utilized to guide the splitting step in order to maintain a modular relationship between the pieces. Circular and half circular shapes are also used in some cases.

6 Claims, 14 Drawing Figures

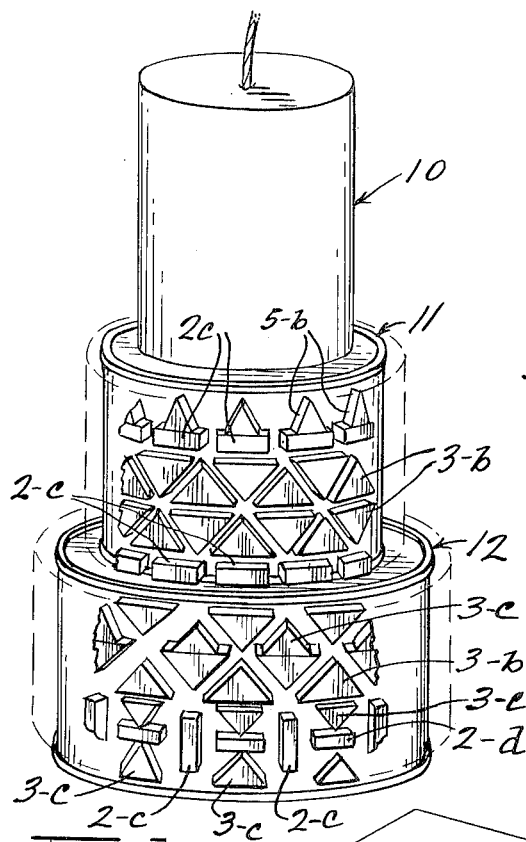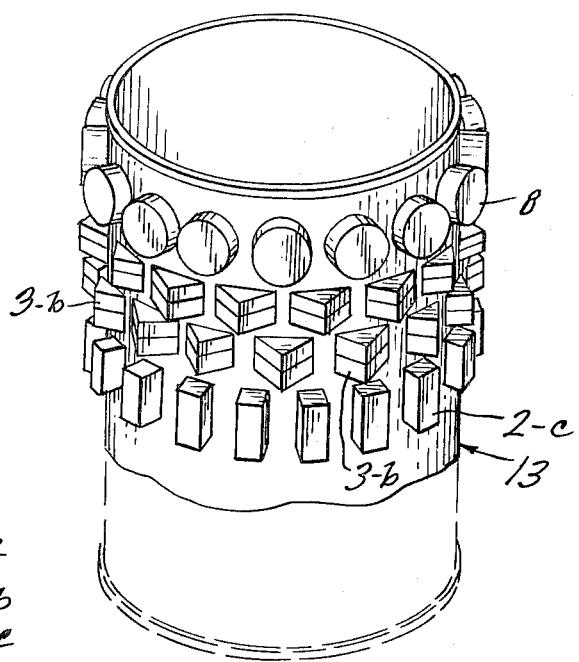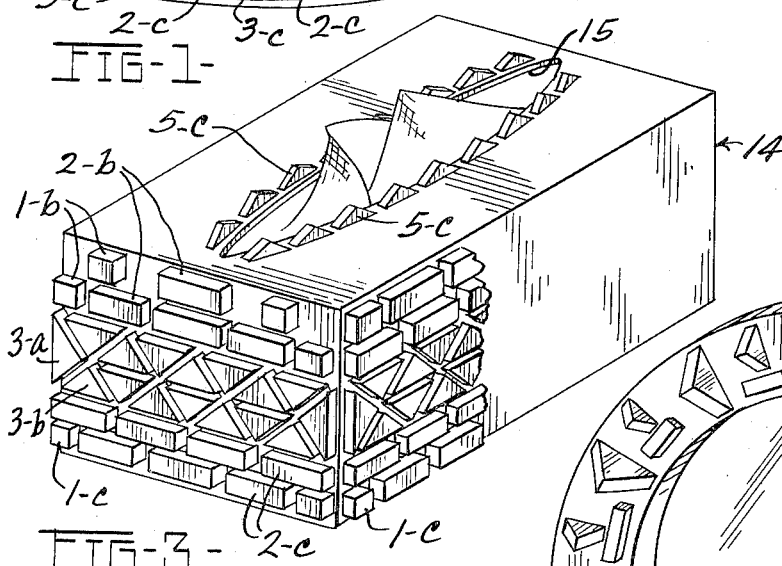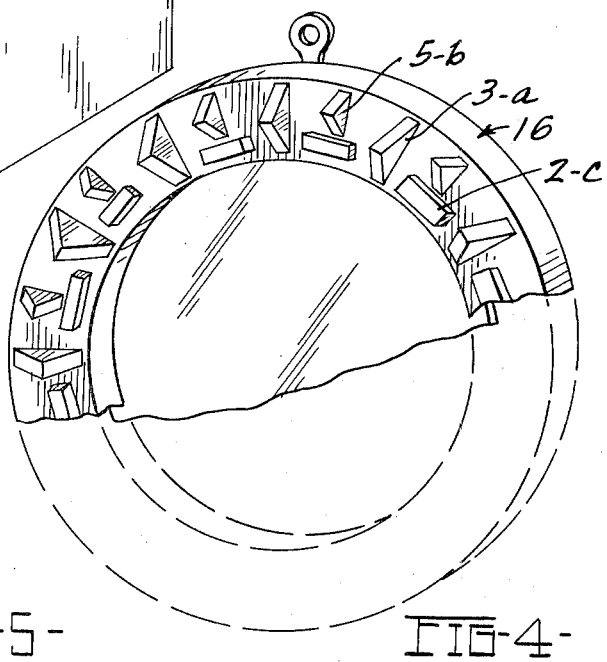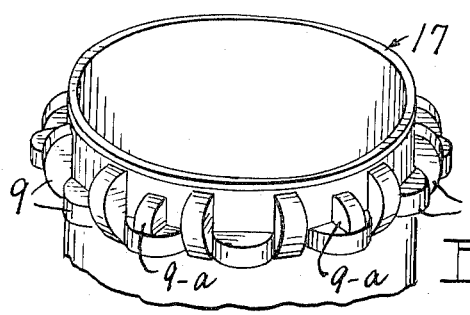

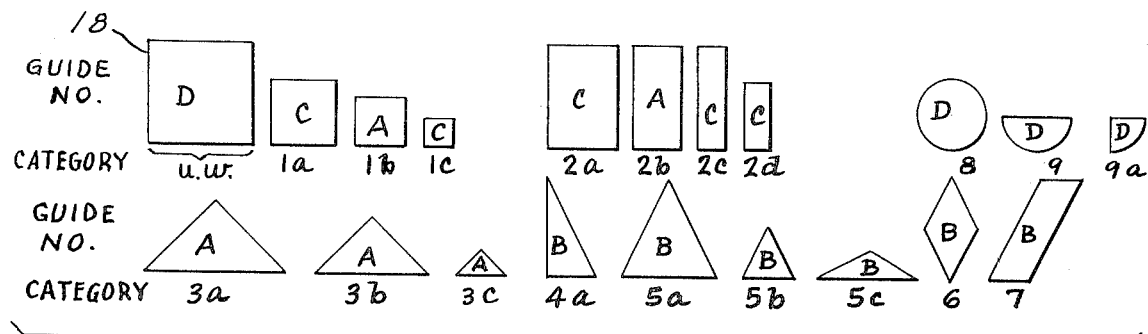
FIG-6-
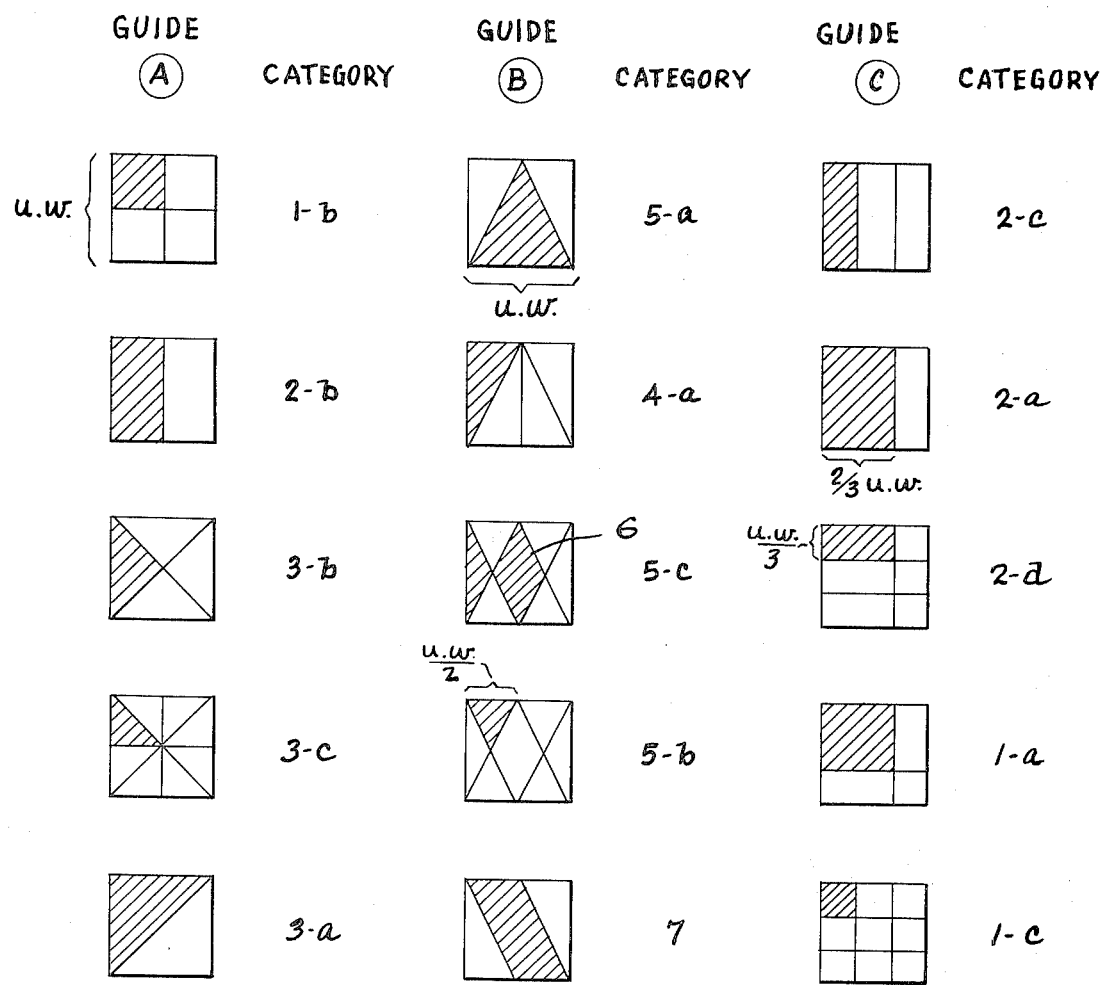
FIG-7-

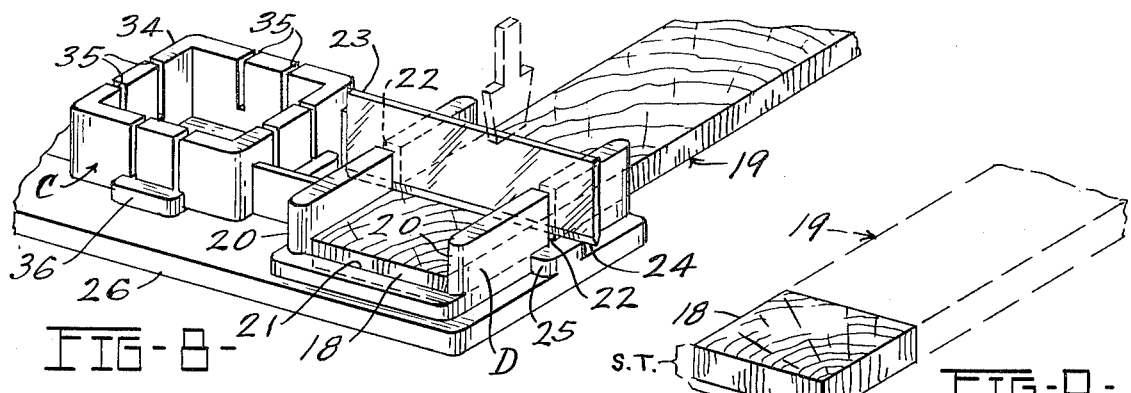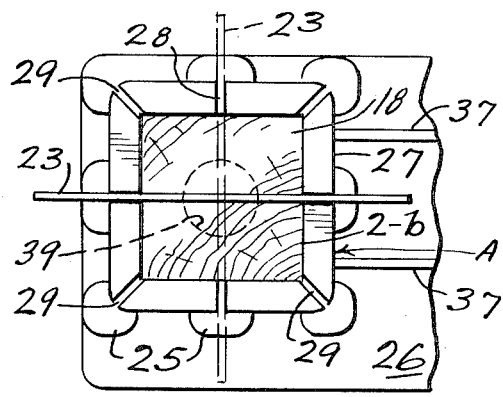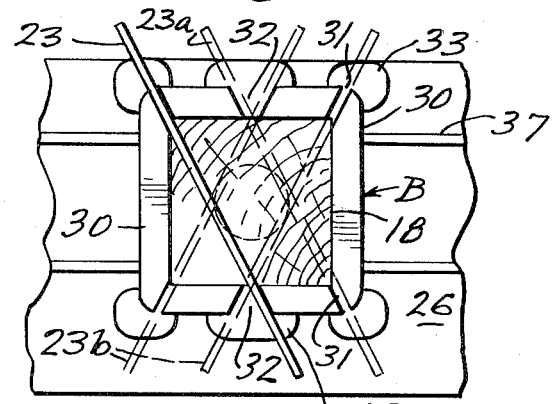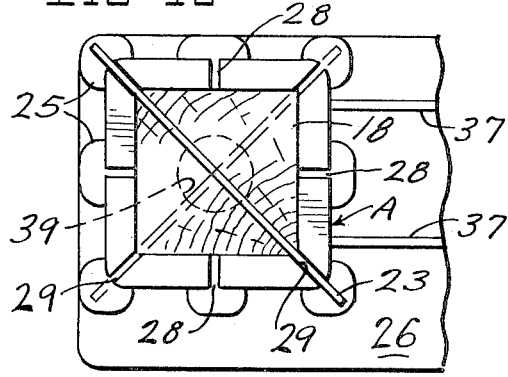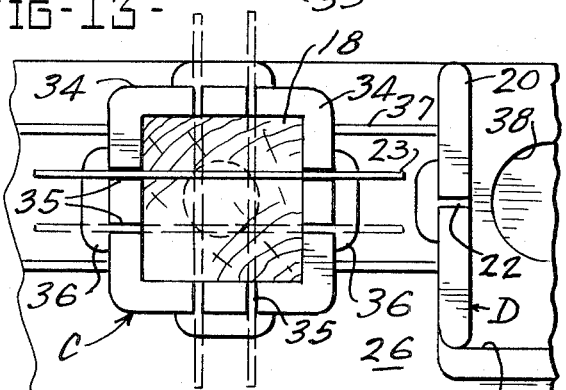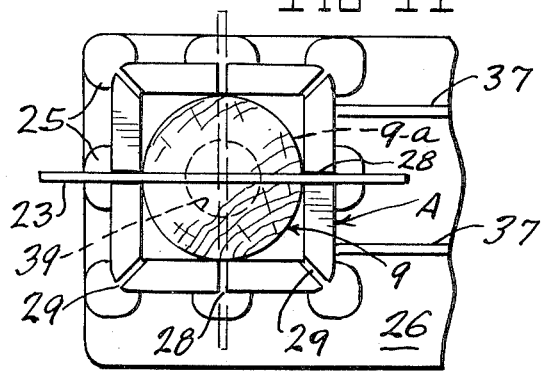

METHOD FOR MAKING A DECORATED OBJECT

BACKGROUND OF THE INVENTION

Because of the great interest in hobbies which consist of the manual creation of decorative objects of various types, particularly those utilizing bits and pieces of materials such as metal, tile, glass, stone, wood, plastic, and the like which are glued in place in patterned relationships, the art generally called "decoupage" has become very popular.

One of the difficulties encountered by any individual hobbiest who wishes to make a decorative object through the practice of the art of adhering to the object various shaped pieces of such materials, or another, is to obtain the material in such size and shape that it can be utilized to assemble patterns which have been suggested to him or to create new patterns of his own origination.

For this reason many kits consisting of prefabricated pieces of the material to be utilized in the decoration accompanied by plans, suggestions and ideas and suitable adhesive for assembling the final project, have been provided by manufacturers working in the hobby and craft fields. Where these pieces are completely preformed and supplied in the kit in their final shapes, much of the interest of the hobbiest is lost because his sole task then consists of merely adhering pieces onto the surface to be decorated.

It is, therefore, the principal object of the instant invention to provide a method for making a decorated object or objects of various sizes, styles, shapes and types by producing and supplying to the hobbiest pre-cut pieces of splittable grain lumber which have a predetermined standard thickness and a unit width and then also supplying the hobbiest instructions and means by which he can carry out the steps of splitting from the pieces a large variety of three dimensional shapes with modular dimensions so that these shapes can then be adhered to the surface of the object or objects to be decorated with proportional relative sizes in order to give to the finished objects artistic proportions and shapes.

BRIEF DESCRIPTION OF THE DRAWINGS

FIGS. 1, 2, 3, 4, and 5 are views in perspective, fragmentary and incomplete, illustrating how various shapes are prepared and utilized according to the invention for the making of decorated objects;

FIG. 6 is a chart showing the plan views and comparative sizes and proportions of shapes fabricated according to the invention for use in decorating objects;

FIG. 7 is a chart again showing plan views of the various shapes fabricated according to the invention and illustrating how each of them is split from a modular unit square;

FIG. 8 is a fragmentary view in perspective of a portion of a splitting guide utilized for fabricating modular unit squares from which the shapes shown in FIG. 7 are split according to the invention;

FIG. 9 is an isometric view of one of the unit squares so fabricated;

FIG. 10 is a fragmentary plan view illustrating how small rectangular and square shapes are split from a unit square;

FIG. 11 is a view similar to FIG. 10 illustrating the use of a splitting device for the fabrication of triangular shapes;

FIG. 12 is a view similar to FIG. 11 illustrating how the same splitting guide may be utilized for fabricating partially cylindrical shapes;

FIG. 13 is a view similar to FIGS. 10–12, inclusive, but illustrating how another splitting guide may be utilized for the purpose of fabricating triangles, diamonds and parallelograms; and FIG. 14 is a view similar to FIGS. 10–12 and 13 illustrating how yet another splitting guide may be utilized for the purpose of fabricating smaller squares and rectangular shapes.

DESCRIPTION OF PREFERRED EMBODIMENT

Preliminarily to the description of the illustrative decorative objects shown in FIGS. 1–5 inclusive, and the description of the method embodying the invention, it should be explained that decorative elements fabricated from the splittable grain lumber by the method of the invention, will be referred to by shape designations, such as 1-*a*, 1-*c* for squares, 2-*a*, 2*b*, 2-*c*, and 2-*d* for rectangles, and the like. For an understanding of any shape referred to in the description of FIGS. 1–5, inclusive, reference should also be made simultaneously to FIGS. 6 and 7 of the drawings which show not only the shapes and their identification but which also identify the particular splitting guides employed for fabricating each of the shapes, the splitting guides themselves being illustrated in FIGS. 8–14, inclusive.

It should also be remembered that although specific individual shapes are shown in artistic and oriented patterns on the objects illustrated as being decorated in FIGS. 1–5, inclusive, the selection of the particular shapes fabricated according to the invention, is merely for that purpose and not to express any limitation on the method of the invention. In some instances, a hobby craft manufacturer may supply to the purchasers of a kit not only the raw materials to be handled according to the invention but also may furnish with such a kit suggested patterns for decorating miscellaneous objects of common type, so that the purchaser of the kit may simply reproduce a design already created by a designer on the manufacturer's staff. Of course, it also follows that anyone purchasing such a kit also may create his own designs for any objects, such as those illustrated in the literature accompanying the kit, or other objects of his own selection.

FIG. 1 illustrates how a holder for a large candle 10 is fabricated according to the invention by first mounting a cylindrical object such as a small can 11 on top of a large cylindrical object such as a larger can 12. After the two cans 11 and 12 are connected to each other, various shapes fabricated according to the invention are adhered to the surfaces of the cans 11 and 12 according to the method of the invention. For example, in FIG. 1, shapes identified as being in categories 2-*c*, 2-*d*, 3-*b*, and 3-*c* and 5-*b* are shown.

Similarly, in FIG. 2, a taller can 13 is shown as partially decorated by the utilization of shapes 2-*c*, 3-*b* and 8.

In the illustrative decoration scheme shown in FIG. 2, two shapes 3-*b* are employed for each protruding triangular configuration identified by the shape number 3-*b*. Similar utilization of two or more of the shapes fabricated according to the invention in close adjacency or in face-to-face or edge-to-edge contact may be employed where desired in order to modify the depth, thickness or width of any individual decorative element.

FIG. 3 illustrates how a rectangular object such as a facial tissue dispensing box 14 might be decorated according to the practice of the instant invention. In FIG. 3 the pattern is shown as comprising some shapes 3-a, a plurality of shapes 3-b, shapes 2-b and 1-b, some shapes 1-c and 2-c, and the like. In this case the box 14 has a top slot 15 through which facial tissues are withdrawn and the slot 15 is illustrated, partly, as being defined by a series of flat triangular shapes 5-c.

It will be realized, of course, that in FIGS. 1–5, inclusive, the particular shapes employed, their spacing, arrangement, orientation, pattern, and so forth, are merely illustrative and, for this reason, most of the decorated objects are not shown as being completely finished, i.e., the patterns are not completed, since they would merely be repetitive over those parts of the surfaces left blank in the figures.

FIG. 4 illustrates how a frame 16 for a mirror or photograph, or the like, readily can be decorated with shapes according to the instant invention. In this instance the shapes shown comprise shapes 3-a, 5-b and 2-c.

In FIG. 5 an open top can 17 is shown as being partially decorated through the use of a plurality of semicircular shapes 9 and some quarter-circle shapes 9-a.

Referring now to FIGS. 6 and 7, and to the splitting guide parts of which are illustrated in each of FIGS. 8–14, the steps of preparing the various shapes according to the invention which are utilized for decorating the surfaces of objects by the method of the invention, will be explained.

In both FIGS. 6 and 7 splitting guides Numbers "A"-"D," inclusive, are referred to and shapes are shown in Categories 1-a, 1-b and 1-c; 2-a, 2-b, 2-c and 2-d; 3-a, 3-b and 3-c; 4-a; 5-a, 5-b and 5-c; 6, 7, 8, 9 and 9-a. Category 1 refers to squares including both full sized "unit-squares" shown in FIG. 6 and identified with guide number "D", and also shown in isometric view in FIG. 9. Such unit-squares are indicated by the reference number 18.

The fabrication of the unit-squares themselves is the first step carried out by a hobbiest according to the invention. FIG. 8 is a fragmentary view in perspective of one end of a splitting guide, particularly showing the splitting guide "D" on which the unit-squares 18 are cut. A kit supplied by the manufacturer includes rectangular pieces of splittable grain wood which are cut by the manufacturer from large slabs of splittable grain wood and all of which preferably have a substantially constant, predetermined "standard thickness" and "unit-width."

As shown in FIG. 9, a unit-square 18 has a standard thickness indicated by the bracket labeled "S.T.," and a unit width indicated by the bracket labeled "u.w.." The unit width thus determines the length of all four sides of a unit-square 18 as indicated, for example, in FIG. 6 and as indicated in several places in FIG. 7 by a bracket and initial letters "u.w.." Similarly, in FIGS. 6 and 7, fractional dimensions of the unit width are shown in a few instances to illustrate how all of the shapes fabricated according to the instant invention relate to each other as comprising one or more dimensions equal to the unit width or to a definite fraction of the unit width, as determined by the method of the invention carried out on the splitting guides to be described below.

The pieces of splittable grain wood, for example, a piece generally indicated by the reference number 19 in FIG. 8 preferably has a length which is equal to a multiple of the unit width so that a series of unit-squares 18 can readily be cut off of each piece. The splitting guide "D" has two parallel side guides 20 that are spaced from each other a distance equal to the unit width, so that the pieces 19 fit snugly between the guides 20. The cutting guide "D" also has a stop 21 and each of its side guides 20 has a slot 22. The slots 22 are aligned transversely of the guide "D" and spaced from the stop 21 a distance equal to the unit width. Each unit-square is split off of a piece 19 by the user who places a splitting knife 23 in the cross guide slots 22 with its lower, sharpened edge 24 against the upper surface of the piece 19 which has been inserted into the guide "D" and moved up against the stop 21. The splitting knife 23 is struck a sharp blow, as indicated by the arrow in FIG. 8, and the splittable grain piece 19 splits along the line of the edge 24 to split a unit-square 18 off of the piece 19.

The person decorating the object in question may continue to split off unit-squares 18 from the pieces 19 until he has accumulated a stock of unit-squares 18 or if preferred, of course, he may simply split off the unit-squares 18 one at a time as needed for subsequent splitting operations in order to provide unit-squares 18 from which the other shapes to be used for decorating the particular object are subsequently split.

Pads 25 are formed at the outer sides of the cross guide slots 22 to stop the downward movement of the splitting knife 23 before it penetrates the full distance through the piece 19 and also to provide a protection to a base 26 on which the guide "D" is mounted or formed.

Assuming now that the person decorating the object has provided himself with a moderate supply of unit-squares 18, he must then decide how many of each of the numerous shapes illustrated in FIGS. 6 and 7 should be cut in order to achieve the decoration of the object which he is decorating. A suitable splitting guide as provided by the manufacturer of the kit includes not only the unit-square splitting guide "D" but, for example, three additional splitting guides identified by the letter "A" (FIGS. 10 and 11), the letter "B" (FIG. 13) and the letter "C" (FIG. 14).

If the person decorating the object wishes to fabricate any of the shapes identified as being cut from guide "A" in FIG. 7 and comprising the shapes of categories 1-b, 2-b, 3-b, 3-c, or 3-a, he utilizes guide "A" as is illustrated in FIGS. 10–12, inclusive. Guide "A" has four side walls 27 erected on the base 26 and each of the side walls 27 has a slot 28 at its mid-point. The slots 28 of opposite side walls 27 are aligned with each other and when the splitting knife 23 is inserted in a pair of the aligned slots 28, rectangular pieces of category 2-b may be formed as illustrated in FIG. 10. Similarly small, quarter unit-squares having the shape 1-b may be split from unit-squares 18 by first cutting two rectangles of shape 2-b and then rotating the knife 90° as indicated by the dotted lines in FIG. 10, to cut each of the rectangles 2-b in half, thus forming four smaller square shapes 1-b from a unit-square 18. The relationship of the half unit-square rectangles, shape 2-b, and the quarter unit squares, shapes 1-b, may be seen by comparing the first two diagrams under guide "A" in FIG. 7 or similarly, the shapes 1-*b* and 2-*b* as shown in FIG. 6.

The shapes as illustrated in FIG. 6 are arranged with similar types grouped together, i.e., squares (18, 1-*a*, 1-*b*, 1-*c*), rectangles (2-*a*, 2-*b*, 2-*c*, 2-*d*), equilateral right triangles (3-*a*, 3-*b*, 3-*c*), right triangle (4-*a*), equilateral triangles (5-*a*, 5-*b*, 5-*c*), and others rather than by reason of the guide upon which each is cut. Conversely, in FIG. 7, the shapes are grouped by the guide upon which each is formed.

If the person wishes to fabricate triangular shapes such as the large triangles, shape 3-*a*, or smaller triangles, shape 3-*b*, or even smaller triangles, shape 3-*c*, the splitting knife 23 is inserted successively either in diagonally aligned slots 29 of guide "A" as shown in FIG. 11, turned 90° therefrom as indicated in the dotted line showing in FIG. 11 or if the smallest shapes of this type, shape 3-*c*, by once again inserting the cutting knife 23 in the transversely extending pairs of slots 28 so that cuts are made in sequence along all of the lines indicated in FIG. 7 adjacent the shapes of categories 3-*a*, 3-*b* and 3-*c*.

As is the case with the guide "D" described above, each of the several guiding slots 28 and 29 of guide "A," is provided with a pad 25 against which the edge 24 of the splitting knife 23 stops after it has been driven downwardly to split a particular unit-square 18 into the shapes desired.

FIG. 12 illustrates how the guide "A" may be utilized for the fabrication of semi-circular shapes 9 from circular shapes 8 of unit diameter supplied by the manufacturer and also quarter circular shapes 9-*a*. Similarly, if desired, circular shapes of smaller diameter may be supplied and split into half and quarter circles on guide "D" as described below.

A third splitting guide "B" is similarly formed on the base 26 for the purpose of enabling fabrication of a number of shapes as shown in FIG. 7 under guide "B" and consisting of shapes 5-*a*, 4-*a*, 5-*c*, 6, 5-*b* and 7. In this splitting guide "B" the slots 31 and 32 are arranged so that the splitting knife 23 may be inserted in a slot 31 at a corner where walls 30 of the guide "B" meet, and in a slot 32 at the center of an adjacent wall. The series of shapes to be formed on guide "B" includes 5-*a*, an isosceles triangle with a base one unit width in length (5-*a*), a right triangle (4-*a*), an isosceles triangle (5-*c*) with a base equal a unit width and a height one quarter of a unit width, as well as a diamond (6), a smaller isosceles triangle (5-*b*) and a parallelogram, 7.

In common with the other guides "A" and "D," guide "B" has the four vertical walls 30 and slots 31. However, slots 32 located in two of the opposed walls 30, are more nearly notches so that the splitting knife 23 can go in at an angle indicated by the reference number 23 and by the dotted line 23*a*, and at an opposed angle indicated by the dotted lines 23*b*. As in the other guides, guide "B" has pads 33 at its slots 31 and 32.

Guide "C", illustrated particularly in FIG. 14, like the guides "A," "B" and "D" has four perimeter walls 34 defining a square space into which one of the unit-squares 18 will snugly fit and each of the walls 34 has two slots 35 located at the one-third points in order to align with each other in opposed pairs thus to provide for dividing a unit-square 18 into nine small squares, shape 1-*c*, or any of the other shapes based upon a ⅓ unit width as shown in FIG. 7 under guide "C" and including shapes 2-*a*, 2-*c*, 2-*d*, 1-*a* and 1-*b*. All of these shapes, whether rectangular or square, have at least one dimension measuring ⅓ or ⅔ of a unit-width.

As in the earlier described guides, the splitting knife 23 can be placed in any of the pairs of opposed slots 35 and a pad 36 is formed on the base 26 at the bottom of each of the slots 35.

All of the guides "A," "B," "C," and "D" preferably are formed on a single base 26 and thus a fragment of the guide "B" is illustrated as being adjacent the guide "C" in FIG. 14. In order to strengthen the side walls 27 of guide "A", 30 of "B," 34 of guide "C," and 20 of guide "D," connectors 37 are formed on the base 26 and extend upwardly between the outer sides of the adjacent walls of several guides. Most economically, all four of the guides are molded as a single unit by the manufacturer who cuts the plurality of pieces of splittable grain lumber such as the piece 19, and supplies them to the purchaser of the kit as a base material from which the many shapes illustrated in FIGS. 6 and 7 and described above are eventually fabricated.

Cylindrical pieces, for example, the shape 8 illustrated in FIG. 6 may also be supplied to the eventual user by the manufacturer cut to the standard thickness and having a diameter either equal to the unit width as illustrated in FIG. 12 or to a lesser diameter which would fit within a circular recess 38 formed in the base 26 and centrally aligned with the cross guide slots 22 of the guide "D" (See FIG. 14). Utilizing the guide "D," these smaller circular shapes can be split into half circular shapes 9 of small diameter or, if the circular shapes have a larger diameter equal to a unit width, the guide "A" may be utilized to split them into half circular shapes or even into quarter circular shapes 9-*a*.

At the center of each of the guides "A", "B" and "C" a hole 39 is formed through the base 26 in order that the shapes split in the guide may be pushed out after splitting.

What I claim is:

1. A method for making a decorated object, said method comprising the steps of:
    A. cutting from large slabs of splittable grain lumber a plurality of pieces of predetermined standard thickness and unit width,
        1. some of said pieces being rectangular and having a length which is a multiple of said unit width,
        2. the grain of all of said pieces extending in the direction of such standard thickness;
    B. placing said rectangular pieces one after another between parallel guides that are spaced a distance equal to such unit width and that have a cross guide for a splitting device and a stop spaced from said cross guide a distance equal to such unit width;
    C. splitting a predetermined number of said pieces with the grain thereof to form unit-squares,
    D. splitting selected ones of said unit-squares to form shapes consisting of squares, rectangles, right triangles, isosceles triangles and diamonds all having dimensions along their sides equal to a unit distance or a fraction of a unit distance as desired for a pattern for decoration and,
    E. adhering selected ones of said shapes in patterned relationships to the surfaces of the object being decorated.

2. A method according to claim 1 and the added step of coloring selected ones of said shapes.

3. A method according to claim 1 in which the shapes are split from the unit-squares along lines extending from the corners of the unit-squares, from the centers of the sides of the unit-squares and from points at one-third points of the sides of the unit-squares.

4. A method according to claim 1 in which some of the pieces are cylindrical and of axial length equal to the standard thickness.

5. A method according to claim 1 and splitting a predetermined number of the cylindrical pieces to form partially cylindrical shapes.

6. A method for making a decorated object, said method comprising the steps of:
   A. cutting from large slabs of splittable grain lumber a plurality of pieces of predetermined standard thickness and unit width,
      1. some of said pieces being rectangular and having a length which is a multiple of said unit width standard thickness and unit width,
      2. the grain of all of said pieces extending in the direction of such standard thickness;
   B. placing said rectangular pieces one after another between parallel guides that are spaced a distance equal to such unit width and that have a cross guide for a splitting device and a stop spaced from said cross guide a distance equal to such unit width;
   C. splitting a predetermined number of said pieces with the grain thereof to form unit-suares,
   D. splitting selected ones of said unit-squares to form shapes consisting of selected ones of,
      1. squares measuring (a) two-thirds unit, (b) one-half unit, and (c) one-ninth unit;
      2. rectangles measuring (a) one by two-thirds units, (b) one by one-half units, (c) one by one-third units, and (d) one-third by two-thirds units;
      3. right isosceles triangles having (a) one unit sides, (b) one unit bases, and (c) one-half unit sides;
      4. right triangles having arms measuring one-unit and one-half unit;
      5. isosceles triangles having (a) one unit bases and one unit heights, (b) one-half unit bases and one-half unit heights, and (c) one unit bases and one-quarter unit heights;
      6. diamonds having one unit major axes and one-half unit minor axes; and
      7. parallelograms having one-half unit short sides, and
   E. adhering selected ones of said shapes in patterned relationships to the surfaces of the object being decorated.

* * * * *